US008965873B2

(12) United States Patent
Khan et al.

(10) Patent No.: US 8,965,873 B2
(45) Date of Patent: *Feb. 24, 2015

(54) METHODS AND SYSTEMS FOR ELIMINATING DUPLICATE EVENTS

(75) Inventors: Omar Habib Khan, Toronto (CA); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/422,458

(22) Filed: Mar. 16, 2012

(65) Prior Publication Data

US 2012/0296903 A1   Nov. 22, 2012

Related U.S. Application Data

(63) Continuation of application No. 10/814,317, filed on Mar. 31, 2004, now Pat. No. 8,161,053.

(51) Int. Cl.
*G06F 13/00* (2006.01)
*G06F 17/30* (2006.01)

(52) U.S. Cl.
CPC .............................. *G06F 17/30864* (2013.01)
USPC ....................................................... 707/706

(58) Field of Classification Search
None
See application file for complete search history.

(56) References Cited

U.S. PATENT DOCUMENTS

| | | |
|---|---|---|
| 5,701,469 A | 12/1997 | Brandli et al. |
| 5,742,816 A | 4/1998 | Barr et al. |
| 5,907,836 A | 5/1999 | Sumita et al. |
| 6,026,388 A | 2/2000 | Liddy et al. |
| 6,092,101 A | 7/2000 | Birrell et al. |
| 6,188,277 B1 | 2/2001 | Borodulin et al. |
| 6,282,548 B1 | 8/2001 | Burner et al. |
| 6,330,589 B1 | 12/2001 | Kennedy |
| 6,487,555 B1 | 11/2002 | Bharat |
| 6,513,036 B2 | 1/2003 | Fruensgaard et al. |
| 6,708,293 B2 | 3/2004 | Kaler et al. |

(Continued)

FOREIGN PATENT DOCUMENTS

EP          1209866 A2          5/2002

OTHER PUBLICATIONS

Pingali, G.S. et al., "Instantly Indexed Multimedia Databases of Real World Events," IEEE Transactions on Multimedia, Jun. 2002, pp. 269-282, vol. 4, Issue 2.

*Primary Examiner* — H S Sough
*Assistant Examiner* — Phuong Hoang
(74) *Attorney, Agent, or Firm* — Finnegan, Henderson, Farabow, Garrett & Dunner, L.L.P.

(57) ABSTRACT

Computer-implemented systems and methods are described for eliminating duplicate events. In accordance with some implementations, a computer-implemented system is provided which includes a computer-readable storage medium that stores program code and a processor that executes the program code. The operations performed by the processor may include capturing an event comprising a user interaction with an article stored in association with a client device and determining a level of similarity between the event and a stored event. The operations performed by the processor may also include determining if the event is a duplicate of the stored event based at least in part on the level of similarity between the event and the stored event and indexing the event on the client device dependent on the determination of whether or not the event is a duplicate of the stored event.

18 Claims, 3 Drawing Sheets

(56) References Cited

U.S. PATENT DOCUMENTS

| | | | |
|---|---|---|---|
| 6,728,763 | B1 | 4/2004 | Chen |
| 6,772,150 | B1 * | 8/2004 | Whitman et al. ............. 707/721 |
| 7,162,473 | B2 | 1/2007 | Dumais et al. |
| 7,181,438 | B1 | 2/2007 | Szabo |
| 7,219,184 | B2 * | 5/2007 | Stojancic ........................ 711/5 |
| 7,346,613 | B2 | 3/2008 | Hurst-Hiller et al. |
| 7,370,035 | B2 | 5/2008 | Gross et al. |
| 7,516,118 | B1 | 4/2009 | Badros et al. |
| 7,634,546 | B1 | 12/2009 | Strickholm et al. |
| 7,650,403 | B2 | 1/2010 | Koetke et al. |
| 7,676,553 | B1 | 3/2010 | Laucius et al. |
| 7,941,439 | B1 | 5/2011 | Lawrence et al. |
| 8,099,407 | B2 | 1/2012 | Auerbach et al. |
| 8,166,014 | B2 * | 4/2012 | Kline et al. ................... 707/706 |
| 8,386,728 | B1 | 2/2013 | Ionescu et al. |
| 2001/0049677 | A1 | 12/2001 | Talib et al. |
| 2002/0055844 | A1 | 5/2002 | L'Esperance et al. |
| 2002/0059265 | A1 | 5/2002 | Valorose, III |
| 2002/0194046 | A1 | 12/2002 | Sullivan et al. |
| 2003/0050966 | A1 | 3/2003 | Dutta et al. |
| 2003/0083947 | A1 | 5/2003 | Hoffman et al. |
| 2003/0154293 | A1 | 8/2003 | Zmolek |
| 2003/0185379 | A1 | 10/2003 | O'Connor et al. |
| 2003/0191626 | A1 | 10/2003 | Al-Onaizan et al. |
| 2003/0212654 | A1 | 11/2003 | Harper et al. |
| 2003/0233419 | A1 | 12/2003 | Beringer |
| 2004/0044962 | A1 | 3/2004 | Green et al. |
| 2004/0078355 | A1 | 4/2004 | Suresh |
| 2004/0088285 | A1 | 5/2004 | Martin et al. |
| 2004/0153444 | A1 | 8/2004 | Senders et al. |
| 2005/0033803 | A1 | 2/2005 | Vleet et al. |
| 2005/0071255 | A1 | 3/2005 | Wang et al. |
| 2005/0080792 | A1 | 4/2005 | Ghatare |
| 2005/0165777 | A1 | 7/2005 | Hurst-Hiller et al. |
| 2006/0036548 | A1 | 2/2006 | Roever et al. |
| 2006/0100912 | A1 | 5/2006 | Kumar et al. |
| 2007/0022102 | A1 | 1/2007 | Saxena |
| 2007/0033275 | A1 | 2/2007 | Toivonen et al. |

* cited by examiner

METHODS AND SYSTEMS FOR ELIMINATING DUPLICATE EVENTS

RELATED APPLICATIONS

This application is the continuation of and claims priority to U.S. application Ser. No. 10/814,317, filed Mar. 31, 2004, which is hereby incorporated by reference in its entirety.

FIELD OF THE INVENTION

The invention generally relates to search engines. More particularly, the invention relates to methods and systems for eliminating duplicate events.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device (s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for information capture. In one embodiment, an event is captured, wherein the event comprises a user interaction with an article on a client device and it is determined whether the event is a duplicate of a stored event. If it is determined that the event is not a duplicate of a stored event, then the event is indexed. If it is determined that the event is not a duplicate of a stored event, then the event can also be stored.

These exemplary embodiments are mentioned not to limit or define the invention, but to provide examples of the embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
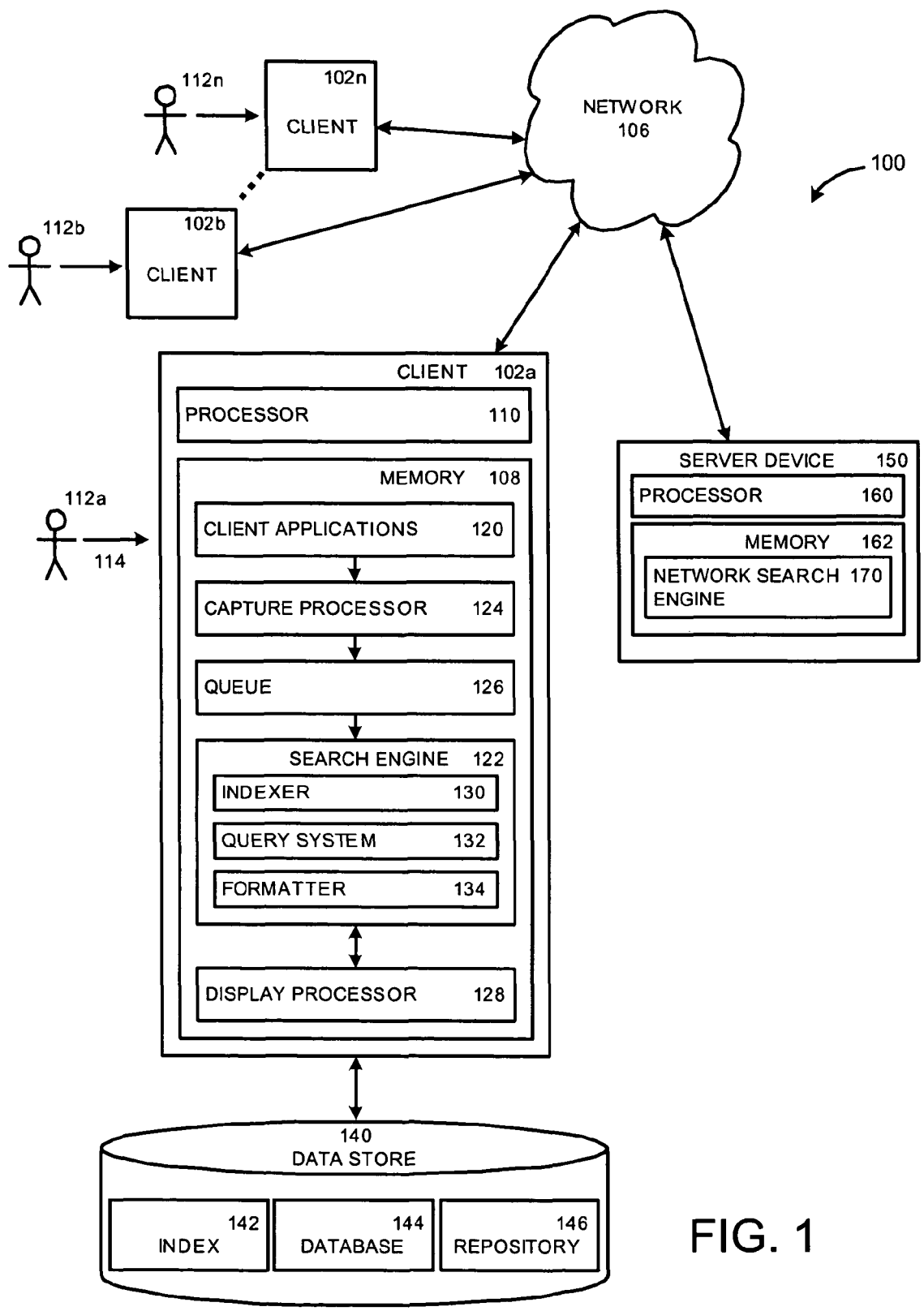
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include a user viewing a web page, saving a word processing document, printing a spreadsheet document, inputting text to compose or edit an email, such as adding a name to the recipients list, opening a presentation application, closing an instant messenger application, entering a keystroke, moving the mouse, hovering the mouse over a hyperlink, moving the window focus to a word processing document, and sending an instant messenger message. An example of event data captured by the capture processor 124 for an event involving the viewing of a web page by a user can comprise the URL of the web page, the time and date the user viewed the web page, the content of the web page in original or processed forms, a screenshot of the page as displayed to the user, and a thumbnail version of the screenshot.

In one embodiment, the capture processor 124 comprises multiple capture components. For example, the capture processor 124 shown comprises a separate capture component for each client application in order to capture events associated with each application. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

The capture processor 124 shown also comprises a separate capture component that monitors overall network activity in order to capture event data associated with network activity, such as the sending or receipt of an instant messenger message. The capture processor 124 shown in FIG. 1 may also comprise a separate client device capture component that monitors overall client device performance data, such as processor load, idle time, disk access, the client applications in use, and the amount of memory available. An individual capture component may monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for user input, such as words typed or displayed to a display device, can include the application used for the input, the format of the text, the words and other items input, and the time input. An event schema for an email event received by a user can include header information, such as the content from the subject, to, from, cc, and time received fields, and body information. An event schema for a web page currently being viewed by a user can include the Uniform Resource Locator or URL of the web page, the time being viewed, and the content of the web page. An event schema for a word processing document being saved by a user can include the title of the document, the time saved, the location of the document, the format of the document, the text of the document, and a pointer to the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents presentation documents, calendar entries and spreadsheet documents, the emails in a user's inbox, and the web pages book marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112*a*. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102*a*, such as a hard drive, or external to the client device 102*a*, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

In one embodiment, when the indexer 130 receives an event, the indexer 130 can determine, from the event schema, terms (if any) associated with the event, the time of the event (if available), files (if any), such as video, audio, style sheets and script files associated with the event, and any other information defining the event. The indexer 130 can also determine if the event is a duplicate event. A duplicate event can be an event that is the same or very similar to another event previously processed by the search engine 122. In one embodiment, if the event is a duplicate, the indexer 130 can update access information for the article associated with the event, but may not index the duplicate event. Duplicate events can be caused by multiple capture components capturing events. In one embodiment, duplicate events are eliminated by the capture processor 124 before they are received by the indexer 130.

The indexer 130 can send and incorporate the terms and times, associated with the event in the index 142 of the data store 140. The event can be sent to the database 144 for storage and the content of the associated article and any associated images can be stored in the repository 146. The indexer 130 can also associate the event with related events. For example, for an event concerning a web page, the indexer 130 can associate this event with other events concerning the same web page. This association information can be stored in the database 133 in a document for each group of related events.

In the embodiment shown in FIG. 1, a user 112*a* can input an explicit query into a search engine interface displayed on the client device 102*a*, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112*a* or client device 102*a*, such as the user's emails, word processing documents, and instant messenger messages, previously viewed web pages and any other article associated with the client device 102*a* or user 112*a*. An article identifier may be, for example, a Uniform Resource Locator (URL), a file name, a link, an icon, a path for a local or remote file, or other suitable information that can identify an article. In another embodiment, the result set also comprises article identifiers for articles located on the network 106 or network articles located by a search engine on a server device. Network articles include articles located on the network 106 not previously viewed or otherwise referenced by the user 112*a*, such as web pages not previously viewed by the user 112*a*.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102*a*. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or .NET libraries, or a web service.

Through the client devices 102*a-n*, users 112*a-n* can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112*a* can also enter a search query in a search engine interface, which can be transmitted to the server device 150 by the client device 102*a* via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102*a-n*, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIGS. 2 through 3.

Various methods in accordance with the present invention may be carried out. For example, in one embodiment, an event is captured, wherein the event comprises a user interaction with an article on a client device and it is determined whether the event is a duplicate of a stored event. If it is determined that the event is not a duplicate of a stored event, then the event can be indexed. If it is determined that the event is not a duplicate of a stored event, then the event can also be stored. If it is determined that the event is a duplicate, then access information for the article associated with the event can be updated.

The event can be partially indexed if the event is determined to be a duplicate of a stored event. Partially indexing the event can comprise indexing a portion of event data associated with the event. If the event is determined to be a duplicate of a stored event, the event can be partially stored.

In one embodiment, determining if the event is a duplicate of a stored event can comprise determining a level of similarity between the event and the stored event. The level of similarity, required to identify the event as a duplicate can be a function of time between the event and the stored event. In one embodiment, determining if the event is a duplicate of a stored event can be a function of time.

In one embodiment, determining whether the event is a duplicate can comprise attempting to match indexable text associated with the event with indexable text associated with stored events or attempting to match an article title associated with the event with article titles associated with stored events. Determining whether the event is a duplicate can also comprise determining a time associated with the event and times associated with stored events and determining a client application in focus at the time associated with the event. The event can comprise processed content and determining whether the event is a duplicate can comprise computing a first duplicate value based at least in part on the processed content and comparing the first duplicate value to duplicate values in a table of duplicate values. The first duplicate value can be computed based on a portion of the processed content. The first duplicate value can be computed based on event data.

In one embodiment, indexing the event can comprise determining indexable terms associated with the event, assigning an event ID to the event, and associating the event ID with the indexable terms in an index. The event can comprise a real-time event or a historical event.

Figure 2:
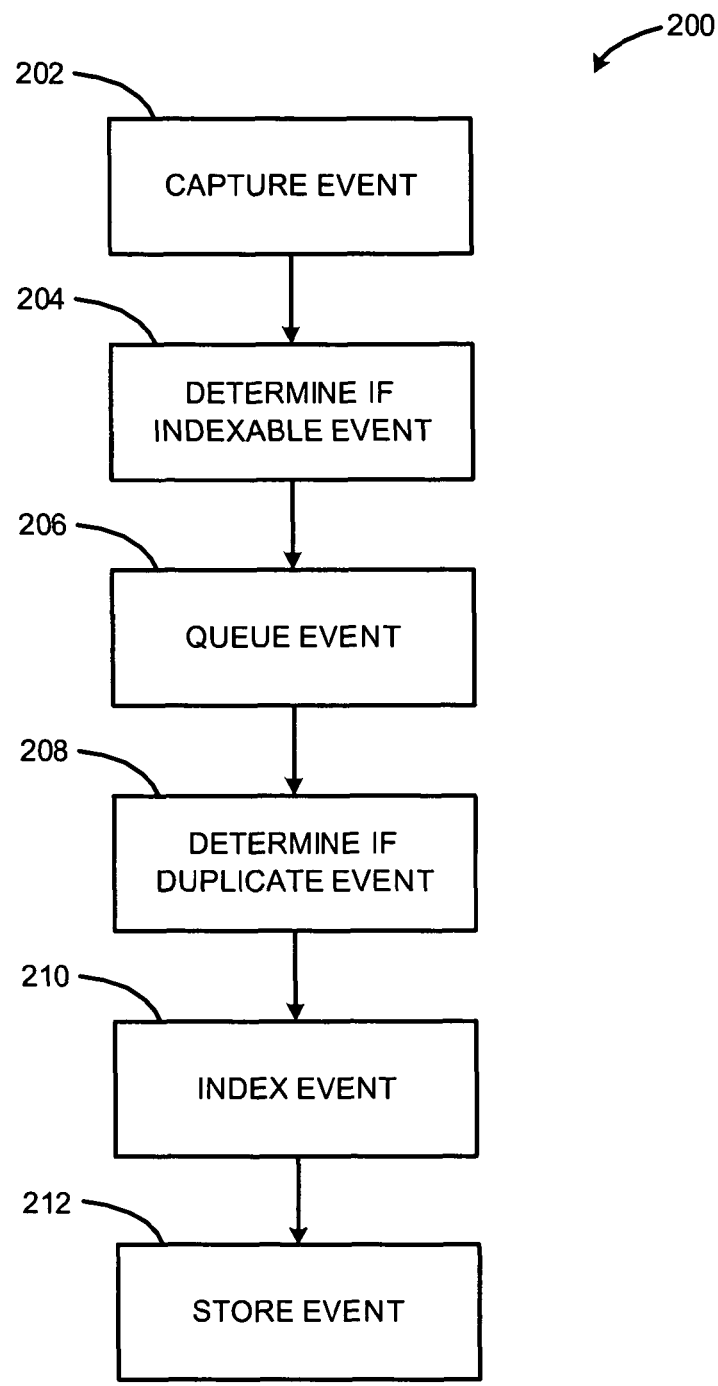
FIG. 2 is a flow diagram illustrating an exemplary method of capturing and processing event data associated with a client device in one embodiment of the present invention.

FIG. 2 illustrates an exemplary method 200 that provides a method for capturing and processing an event. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The event can be a real-time event or can be a historical event. The capture processor 124 can capture a real-time event by identifying and extracting event data associated with the event upon the occurrence of the event. The capture processor 124 can capture a historical event, for example, by periodically crawling the memory 108 or associated data storage device of the client device or receiving articles or data from client applications. The capture processor 124 may have separate capture components for each client application, network monitoring, performance data capture, keystroke capture, and display capture. For example, an event can occur when a user 112a types a predetermined number of words in a client application. The event data associated with this event can be, for example, the application used for the input, the format of the text, the words input, and the time input. In one embodiment, the capture component can use a generalized event definition mechanism, such as an event schema that it has previously defined and registered with the client device 102a, to capture or express the event.

In 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed and sent for storage by the indexer 130. Indexable events can be indexable real-time events or historical events.

If an indexable event is determined, then in 206 the event can be sent by the capture processor 124 to the queue 126 with an indication that it is an indexable event. In the embodiment shown, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, the non-indexable event can be sent by the capture processor 124 to the user state queue of the queue 126 with an indication that it is not to be indexed.

In one embodiment, the queue 126 holds the event until the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the indexer 130 retrieves an event and determines if the retrieved event is a duplicate event. A duplicate event can be created due to multiple capture components capturing the same event or portions of the same event, repeated access to an article, or applications that automatically save file periodically, for example. In some situations, the capture components may use a common article identifier. In these situations, the indexer 130 can determine duplicate events based on the time of the event and the article identifier. In some situations, different capture components may assign a different article identifier to the same article or a capture component may not provide article identifiers. For example, when a word processing document is opened, a word processing capture component can create an open article event and a client device capture component can create an open article event. In some cases, the word processing program will provide one article identification number and the client device capture component will provide a different article identification number for the same article. In this example, two events are created each with an associated unique identification number for the article. In another example, text is entered into a word processing document, for example, twenty words. The word processing capture component can create an event upon the entry of the twenty words and use the article identifier from word processing application. The keystroke capture component can compile an event for every five words, but not provide an article identifier. In this example, for the one word processing capture component event there are four corresponding keystroke capture component events. However, because the keystroke capture component does not have an article identifier, the keystroke events may not be easily associated with a word processing event. In these situations, the indexer 130 can use word matching or title matching and the times the events occurred to determine if the event is a duplicate.

It may also be desirable to detect duplicate events from the same capture component. For example, some users may often save an article as they are working on it, creating a large number of identical or near-identical (what are sometimes referred to as "near duplicate") versions, alternatively some applications may automatically save articles at a regular interval. It can be desirable to consider repeated events within a certain time interval as duplicates based on different criteria as used for events spaced further apart in time. For example, the addition of a few words to an article each day for several days may be considered separate events, whereas if an article is saved very regularly over the course of a few minutes, it can be desirable to consider these events as duplicates, in order to prevent adding a very large number of events to the data store which may slow down the client device. For example, two events for a particular word processing document may be considered duplicates based on the filename if the events are within a few minutes of each other, whereas events spaced further in time may be considered duplicates only if the content of the document is the same. Near-duplicate events may be detected by duplicate detection techniques as described below (for example, breaking an event into multiple portions and considering how many of the portions are duplicates of portions of other events) as well as other suitable techniques.

Figure 3:
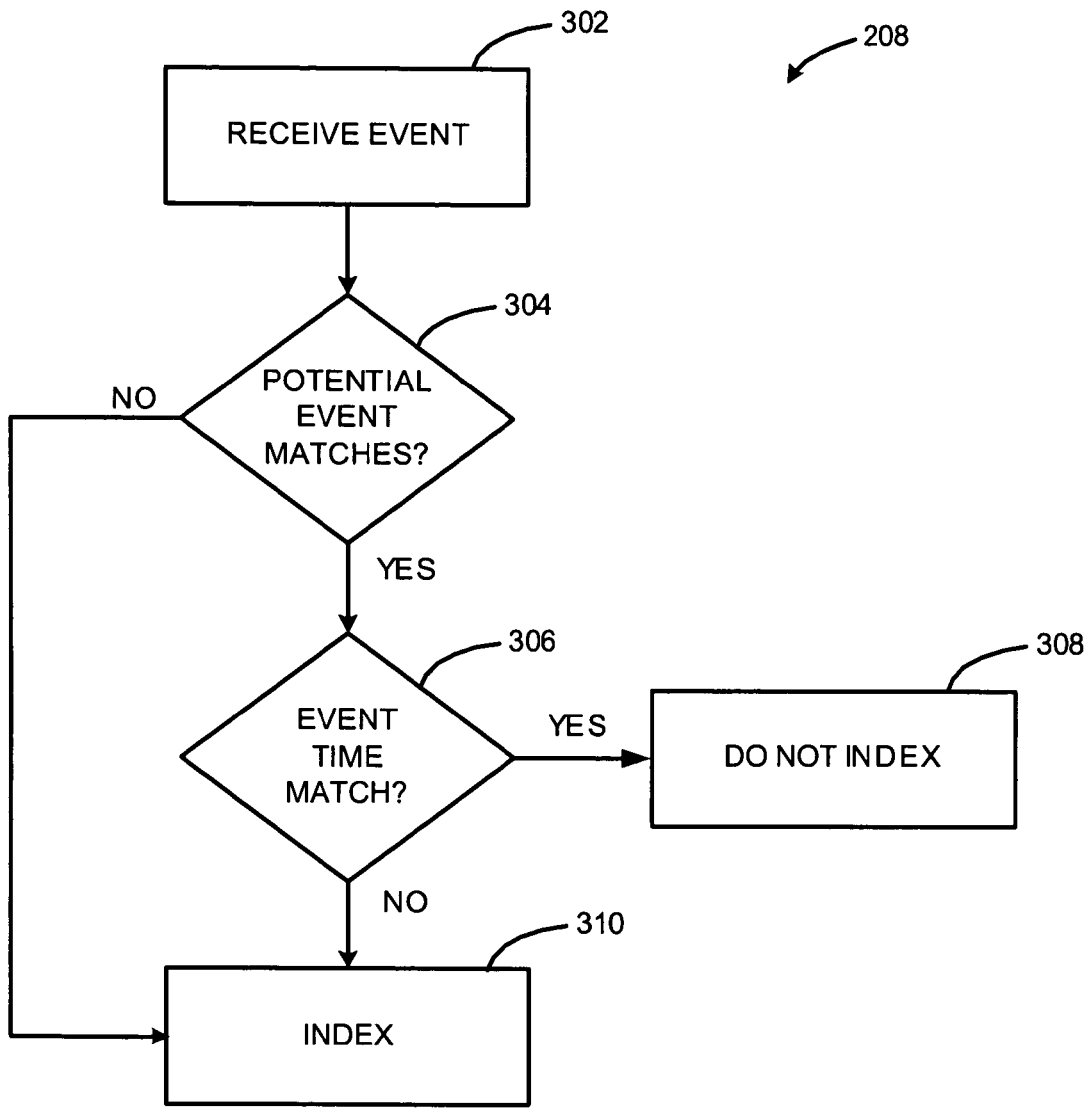
FIG. 3 is a flow diagram illustrating an exemplary method of determining duplicate events in one embodiment of the present invention.

FIG. 3 illustrates an exemplary method that provides a method 208 for identifying duplicate events. In one embodiment, the indexer 130 performs the exemplary method 208 and in another embodiment the capture processor 124 performs the exemplary method 208. In 302, the indexer 130 retrieves an event. The event can be retrieved from the index queue in the queue 126. After the event is retrieved, the indexer 130 can determine the terms associated with the event, the time of the event, images associated with the event, and other information defining the event. For an example where the user 112a opens an email, the indexer 130 can determine, from the event, the sender of the email, the list of recipients of the email, the terms in the subject line of the email, the time and date the email was received, the time and date the email was opened and viewed by the user, and key terms in the content of the email. The event may also have processed content associated with it. Processed content can be the raw data converted into a text format.

In 304, the indexer 130 determines whether there is a stored event or are stored events that are potential matches for the event. A stored event can be an event that has been previously indexed by the indexer 130 and stored in the data store 140. The indexer 130 can determine a level of similarity for the event and the stored event. The level of similarity can be a function of time between the event and the stored event, such that stored events appearing closer in time to the event may require a lower similarity in order to not be considered duplicates. In one embodiment, the indexer 130 can compare the indexable text of the event with the indexable text of stored events from the database 144 to determine a level of similarity.

For example, a duplicate value for the event can be created that can be used to determine a level of similarity. The duplicate value may be a fingerprint. A fingerprint can be the output of a cryptographic hash function (a hash digest) such as MD5, etc. These generally aim to be collision-free, meaning that is difficult for the same fingerprint to be generated by two different pieces of data. Thus, when two identical fingerprints are found, the system can assume that the data that generated them was identical. In one embodiment, the fingerprint can be computed based on the processed content associated with the event. For example, the indexer 130 can go over the processed content and compute the duplicate value, such as, for example, a number, based on the data in the content. The entire processed content or a portion of the processed content may be used to compute the duplicate value. Additional event data, such as location, can also be used in to compute the duplicate value. The duplicate value can be compared to a table of duplicate values to determine a match. A match can be determined if two duplicate values are identical or are similar. In one embodiment, a level of similarity is determined based on the comparison of the duplicate value to the table of duplicate values.

In another embodiment, the storage location of the article associated with the event can be first compared to storage locations for previously processed events. If a match in storage locations is determined, then duplicate values for the matched events can be compared to determine if the current event is a duplicate event.

In another embodiment, the indexer 130 compares the title of the article associated with the event with the titles of articles associated with stored events from the database 144. Other ways of identifying potential matches or levels of similarity are possible. If the indexer 130 determines that no stored events match the event or the event does not meet a certain level of similarity, then the indexer can index the event in 310.

If the indexer 130 determines that a stored event or stored events match the event or that the event meets a certain level of similarity with a stored event, in 306, the indexer 130 may determine whether the matched stored event or events occurred at a time close to the event and/or whether other event data associated with the events match. If a stored event has the same or very similar indexable text as the event and occurred close in time to the event, then this can mean there is a high likelihood that the event is a duplicate event of the stored event. The indexer 130 can also determine the client application in focus at the time the event occurred and eliminate stored events as potential matches that are not associated with the client application in focus at the time of the event.

For example, if a duplicate value for the current event is determined and the duplicate value matches a duplicate value in the duplicate value table, then the event associated with the matched duplicate value can be retrieved. Event data, such as time of occurrence, can be compared for the two events. If the events are within a certain time period, for example, a few seconds, of each other, then the indexer 130 can identify the current event as a duplicate. In one embodiment, the storage location for articles associated with matched events can be also be compared. A mismatch in storage locations will not always indicate a non-duplicate event, such as, where the user has copied an article to a new location. This information can however be used by the search engine 122 to discern what the user is interested in.

In one embodiment, the method used for determining if an event is a duplicate of a stored event can change based on the amount of time between the event and the stored event. For example, if the two events are close in time, a determination of whether the event is a duplicate can be based on the file name or storage location. If the two events are more separate in time, a determination of whether the event is a duplicate can be based on a content comparison or a duplicate value comparison between the two files.

In 308, if the indexer 130 determines that the event is a duplicate, then it may not index the event. In one embodiment, the indexer 130 updates access information for the article associated with the duplicate event. In one embodiment, a duplicate event may still be indexed, but can be indexed in a different manner than a non-duplicate event. For example, information about the duplicate event, such as, for example, the article name and time, may be indexed and/or stored, but the content of the event may not be indexed and/or stored. The duplicate event may refer to an original event for the content. In one embodiment, the duplicate event may be occurring too frequently to warrant full storage, but if the user is frequently accessing the article the search engine 122 can increase the "importance" of the original article.

In 312, if the indexer 130 determines that the event is not a duplicate it indexes the event. In one embodiment, the event is indexed as described below for 210.

Returning now to FIG. 2, in 210, if the event is determined not to be a duplicate event, the event can be indexed by the indexer 130. In one embodiment, the indexer 130 can send and incorporate terms and times, associated with the event, in the index 142 of the data store. For example, the indexer 130 can assign an event ID to the event and can associate the event ID with the appropriate terms in the index 142. As discussed above, a duplicate event may be indexed, but may be indexed in a different manner than a non-duplicate event. For example, the duplicate event may be partially indexed so that only a portion of the event data, such as article name and time, are indexed. The content of the article associated with the duplicate event may not be indexed.

In 212, the event is stored in the data store 140. In the embodiment shown, the event can be stored in the database 144 and the content of the event can be stored in the repository 146. Turning to the email example used above, the name of the sender of the email, the names on the list of recipients of the email, the terms from the subject line of the email, the key terms from the content of the email, and the various times and dates associated with the email can all be stored in the index and be given an event ID tying all of these items to the email event. The email event, including the event data, may be stored in the database 144. The email itself may be stored in the repository 146. In one embodiment, for a duplicate event, the event may be stored and indexed, but the content may not be stored. An indication can be included with the duplicate event pointing to the content associated with the original event.

The capturing of events that are indexed and stored by the search engine 122 allows the user 112a to search for articles on the client device 102a and allows the search engine to automatically search for articles on the client device 102a.

The environment shown reflects a client-side search engine architecture embodiment. Other embodiments are possible, such as a stand alone client device or a network search engine.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A computer-implemented system, comprising:
a processor for executing program code; and
a non-transitory computer-readable storage medium storing program code executable to perform steps comprising:
capturing an event comprising a user interaction with an article stored in association with a client device;
determining an amount of elapsed time between the event and a stored event, wherein the amount of elapsed time is greater than zero;
determining a level of similarity between the event and the stored event;
modifying a threshold level of similarity used to identify the event as a duplicate based on the amount of elapsed time; and
determining if the event is a duplicate of the stored event based at least in part on the level of similarity between the event and the stored event and the threshold level of similarity; and
indexing the event on the client device dependent on the determination of whether or not the event is a duplicate of the stored event.

2. The system of claim 1, wherein the event is indexed if the event is determined not to be a duplicate of a stored event.

3. The system of claim 1, wherein the event is partially indexed if the event is determined to be a duplicate of a stored event.

4. The system of claim 3, wherein partially indexing the event comprises indexing a portion of event data associated with the event.

5. The system of claim 1, the program code further executable to partially store the event if the event is determined to be a duplicate event.

6. The system of claim 1, the program code further executable to store the event if the event is determined not to be a duplicate of a stored event.

7. The system of claim 1, the program code further executable to update access information for the article associated with the event if the event is determined to be a duplicate of a stored event.

8. The system of claim 1, wherein determining whether the event is a duplicate comprises comparing indexable text associated with the event with indexable text associated with stored events.

9. The system of claim 1, wherein determining whether the event is a duplicate comprises attempting to match an article title associated with the event with article titles associated with stored events.

10. The system of claim 1, wherein determining whether the event is a duplicate comprises computing a first duplicate value based at least in part on event data of the captured event and comparing the first duplicate value to stored duplicate values computed for stored events.

11. The system of claim 10, wherein the first duplicate value comprises a first hash computed on the event data of the captured event and wherein the stored duplicate values comprise stored hash values computed on the stored events.

12. The system of claim 1, wherein determining whether the event is a duplicate comprises determining a client application in focus at the time associated with the event.

13. The system of claim 1, wherein indexing the event comprises:
determining indexable terms associated with the event;
assigning an event ID to the event; and
associating the event ID with the indexable terms in an index.

14. The system of claim 1, wherein the event comprises a real-time event or a historical event.

15. The system of claim 1, wherein determining a level of similarity between the event and the stored event comprises comparing a storage location of the article associated with the event to a storage location of an article associated with the stored event.

16. The system of claim 1, wherein determining if the event is a duplicate of the stored event comprises determining that the event is a duplicate event if the event and the stored event are within a predetermined time amount of elapsed time.

17. A computer-implemented system, comprising:
a processor for executing program code; and
a non-transitory computer-readable storage medium storing program code executable to perform steps comprising:
capturing an event comprising a user interaction with an article stored in association with a client device;
determining an amount of elapsed time between the event and a stored event from a database of stored events, wherein the amount of elapsed time is greater than zero;
modifying a threshold level of similarity used to identify the event as a duplicate based on the amount of elapsed time;
comparing indexable text associated with the captured event with indexable text associated with the stored event from the database of stored events to determine if the threshold level of similarity is met;
determining if the captured event occurred within a predetermined time period after the stored event, wherein the predetermined time period is greater than zero;
determining that the captured event is a duplicate of the stored event if the threshold level of similarity between the captured event and the stored event is met and the captured event occurred within the predetermined time period after the stored event;
indexing the captured event if the captured event is determined not to be a duplicate of a stored event;
storing the captured event if the captured event is determined not to be a duplicate of a stored event; and
updating access information for the article associated with the captured event, if the event is determined to be a duplicate of a stored event.

18. A computer-implemented system, comprising:
a processor for executing program code; and
a non-transitory computer-readable storage medium storing program code executable to perform steps comprising;
capturing an event comprising a user interaction with a stored article;
determining an amount of elapsed time between the event and a stored event wherein the event and the stored event are associated with different times;
determining a level of similarity between the event and the stored event;
modifying a threshold level of similarity used to identify the event as a duplicate based on the amount of elapsed time; and
determining if the event is a duplicate of the stored event based at least in part on the modified threshold level of similarity.

* * * * *